United States Patent [19]

Harries

[11] 4,112,682

[45] Sep. 12, 1978

[54] MASTER CYLINDER ASSEMBLIES

[75] Inventor: David Anthony Harries, Shirley, England

[73] Assignee: Girling Limited, Birmingham, England

[21] Appl. No.: 674,058

[22] Filed: Apr. 5, 1976

Related U.S. Application Data

[62] Division of Ser. No. 424,886, Dec. 14, 1973, Pat. No. 3,994,535.

[30] Foreign Application Priority Data

Jul. 25, 1973 [GB] United Kingdom ............... 35393/73

[51] Int. Cl.² ............................................. B60T 13/12
[52] U.S. Cl. ........................................ 60/548; 60/550; 60/568; 60/581; 60/589

[58] Field of Search .................. 60/534, 545, 547, 550, 60/562, 581, 551, 568, 589, 582, 593, 548; 91/437; 188/358, 359; 303/21 F, 21 FB

[56] References Cited

U.S. PATENT DOCUMENTS

| 3,283,505 | 11/1966 | Julow | 60/550 |
| 3,729,235 | 4/1973 | Bach | 60/549 |
| 3,888,547 | 6/1975 | Ron | 60/551 |

Primary Examiner—Martin P. Schwadron
Assistant Examiner—Abraham Hershkovitz
Attorney, Agent, or Firm—Scrivener, Parker, Scrivener & Clarke

[57] ABSTRACT

A booster operated master cylinder piston for use in an anti-skid braking system includes a modulator piston located between the master cylinder piston and the booster valve assembly. In the event of a skid the pressure of booster fluid acting on the modulator piston is equalized across the modulator piston.

2 Claims, 7 Drawing Figures

MASTER CYLINDER ASSEMBLIES

SPECIFIC DESCRIPTION

This is a division of application Ser. No. 424,886 filed Dec. 14, 1973, now U.S. Pat. No. 3,994,535.

This invention relates to master cylinder assemblies for vehicle hydraulic braking systems of the kind comprising a piston adapted to be advanced in a bore in a housing to generate fluid pressure in a pressure space in the bore in front of the piston, an inlet port in the housing adapted to connect the pressure space to a reservoir for fluid through a normally open valve which is closed when the piston is advanced, and an outlet port in the housing adapted to connect the pressure space to at least one wheel brake. Master cylinder assemblies of this kind may generate pressure hydrostatically, with or without power assistance, or by operating valve means controlling a source of hydraulic fluid under pressure.

When the master cylinder assemblies of the kind set forth are combined in vehicle hydraulic braking systems it is desirable also to incorporate in the system modulating means for relieving the fluid pressure applied to the wheel brake in skid conditions.

Such modulating means usually includes a modulator for cutting-off the supply of fluid to the wheel brake and subsequently modulating the pressure of the fluid to release and re-apply the brake, the modulator being responsive to the deceleration of the braked wheel.

Such braking systems are complex and expensive and it may be necessary to provide separate sources of hydraulic fluid under pressure for operation of the master cylinder assembly and the modulator. A considerable amount of space is required to accommodate the modulators which are bulky. Usually a separate modulator is required for each front wheel brake, and a further additional modulator for the rear wheel brakes.

According to our invention a master cylinder assembly of the kind set forth includes means for applying a force to the piston to advance the piston, and modulating means for modulating the force applied to the piston in skid conditions.

Thus, modulation of the braking pressure is achieved by modulating the force applied to the master cylinder piston, when the master cylinder assembly is installed in a vehicle braking system the functions of brake application and modulation are performed in a single assembly which is smaller than a separate master cylinder and modulator. Hence installation in a limited space is facilitated.

Conveniently the applying means includes a booster valve assembly for controlling booster fluid under pressure to advance the piston; and conveniently the modulating means includes a modulator piston adapted to advance the master cylinder piston under the force provided by the booster fluid.

Preferably the master cylinder assembly includes a control space ahead of the modulator piston and a control port leading into this space is connected to the booster fluid through fluid control means which are arranged to equalize the pressure across the piston in the event of a skid.

The advantage of interconnecting both sides of the modulator piston are than the braking pressure is relieved more quickly and less booster fluid is dumped, especially in bad skid conditions when the fluid control means are actuated repeatedly.

The master cylinder piston may be part of a separate hydrostatic master cylinder or power valve assembly which is attached to or integral with the modulator piston/booster valve assembly. The master cylinder piston may also control the supply of booster fluid to the brake, so that a single source of fluid under pressure may be used to perform two separate functions. Preferably, the master cylinder piston and the modulator piston are separate though they could be integral.

The master cylinder piston may be the primary piston of a tandem master cylinder. In any one master cylinder assembly according to the invention there may be one, two, three or more master cylinder pistons. Where there are a plurality of master cylinder pistons they may be arranged in parallel and angularly spaced about the axis of a single booster valve assembly.

A separate modulating piston may be provided for each master cylinder piston, whereby the braking pressure generated by each master cylinder piston can be controlled individually by the fluid control means. A single modulating piston may be used for two or more master cylinder pistons. This will not be so efficient since braking pressure may be relieved on a non-skidding wheel.

Preferably the booster valve assembly is pedal-operated and so arranged that a pedal-operated member applies the modulating piston or pistons mechanically in the event of a failure in the supply of booster fluid.

The booster valve assembly includes a normally open reservoir valve and a normally closed inlet valve.

Conveniently, the pedal-operated member has an extension adapted to engage a movable stop member after the inlet valve has been opened, the stop member being biassed towards the extension whereby when the extension engages the stop member the resistance to pedal movement in the applying direction increases to overcome the biassing force, thus preventing the driver of the vehicle from "pushing-through".

Preferably the booster valve assembly is arranged so that the stop member is biassed by booster fluid whereby resistance to additional pedal travel is reduced when the booster fluid fails.

This invention also relates to anti-skid hydraulic braking systems incorporating a master cylinder assembly of the kind set forth, means for applying a force to the master cylinder piston to apply the brake, modulating means for modulating the force applied to the piston, and skid sensing means for actuating the modulating means.

Conveniently the master cylinder assembly is operated by a fluid under pressure and the modulating means are arranged to relieve the force applied by the fluid.

Preferably a control valve controls a connection between chambers at opposite ends of a modulator piston arranged to apply the master cylinder piston. Normally fluid under pressure is admitted to the chamber behind the piston to apply the brake and in a skid the control valve operates to interconnect the two chambers and so reduce the force on the modulator piston acting in the applying direction.

Some embodiments of a master cylinder assembly according to our invention are illustrated by way of example, in the accompanying drawings, in which.

Figure 1:
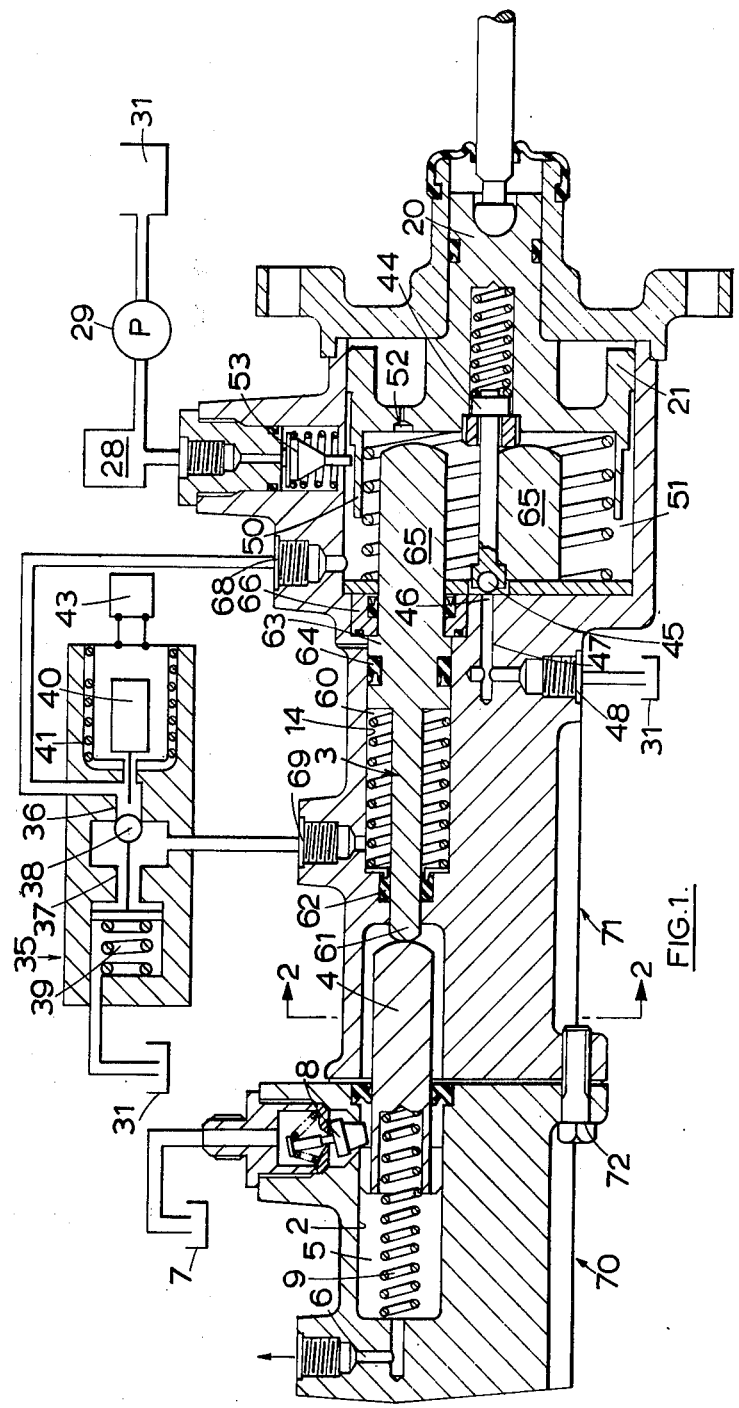
FIGS. 1 and 2 are interelated sections of a master cylinder assembly.
Figure 2:
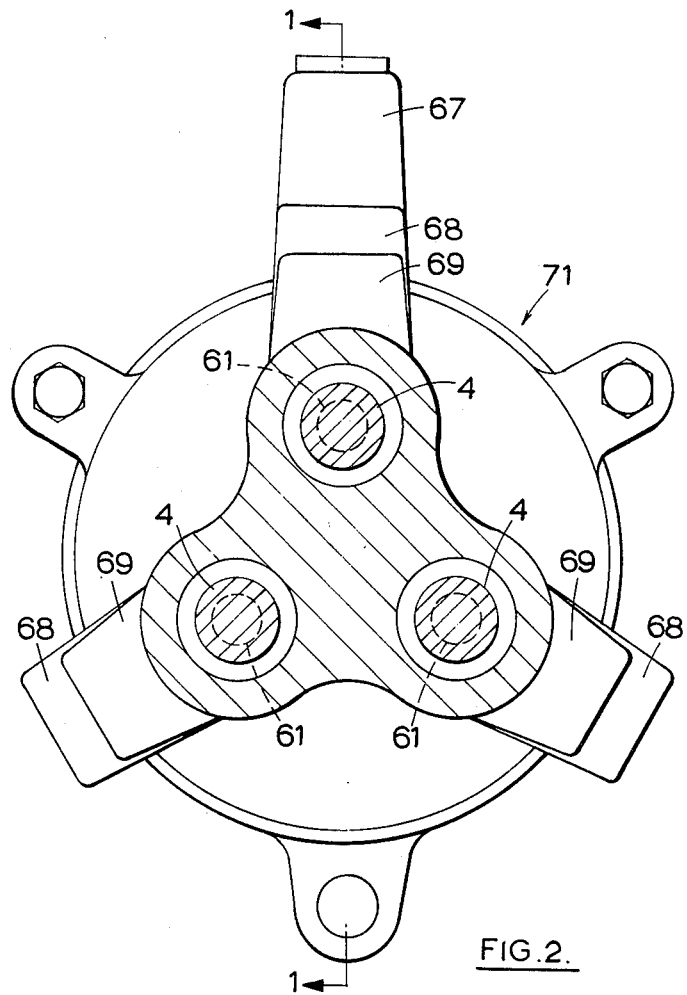

In the power or booster operated master cylinder assembly illustrated in FIGS. 1 and 2 of the accompanying drawings 70 is a master cylinder housing part provided with three parallel longitudinally extending bores 2 in each of which works a main piston 4 for pressurising fluid in a pressure space 5 in the bore 2 in the front of the piston 4. The pressure space 5 is adapted to be connected to the brakes of at least one wheel of a vehicle through an outlet port 6 and to a reservoir 7 for fluid through a tipping valve 8. Normally the valve 8 is held in an open retracted position by means of a flange on piston 4 which is held in a retracted position by return spring 9. Preferably two of the outlet ports are connected to brakes on different front wheels of a vehicle, and the third port is connected to both rear wheel brakes.

A separate booster valve/modulator assembly 71 is bolted to the master cylinder housing by bolts 72. The assembly has three stepped longitudinal bores 14 aligned with the bores 2 and leading into a chamber 51 at the end of the assembly remote from the master cylinder housing 70. In each of the bores 14 works a stepped modulator piston 3, a smaller diameter portion 61 working through a seal 62 to engage a main piston 4, and a larger diameter portion 63 carrying a seal 64. A pressure space 60 is defined between seals 62 and 64. An extension 65 of intermediate diameter extends rearwardly from the larger diameter portion through a seal assembly 66 into chamber 51.

An axially movable pedal-operated member 20 is sealed in a central opening in the rear wall of the assembly. The inner end of member 20 carries a radial flange 21 guided on the wall of chamber 51 and having a forwardly extending skirt 50 adapted to operate a tilting valve 53 controlling an inlet port 67. Normally valve 53 is closed cutting off communication between port 67 and chamber 51, port 67 being connected to an accumulator 28 pressurised by a pump 29 which is supplied from reservoir 31. A passage 52 through flange 21 maintains equal pressures on both sides of flange 21.

The pedal-operated member 20 is coupled to a displaceable stem 44 carrying at its free end, a valve head 45 for engagement with a seating 46 at the inner end of an axial passage 47 which leads from chamber 51 to port 48 connected to reservoir 31.

Chamber 51 also has an outlet port 68 which is connected to a control port 69 leading into pressure space 60 via pressure control means in the form of a solenoid valve 35. The valve 35 incorporates first and second axially spaced seatings 36 and 37 and a valve member in the form of a ball 38 for engagement alternately with the seatings 36 and 37. Normally the ball 38 is urged into engagement with the seating 36 by means of a spring 39 so that pressure space 60 is connected to reservoir 31. The valve also incorporates an armature 40 which urges the ball 38 out of engagement with seating 36 and into engagement with seating 37 when the solenoid 41 is energised by skid sensing means 43. In this position communication between space 60 and reservoir is cut off and chamber 51 is connected to space 60. Normally a separate control valve will be connected between each pressure space 60 and chamber 51 and the skid sensing means 43 will incorporate a sensor on each wheel and electronic control means for sending a signal to the appropriate control valve when the deceleration of a braked wheel exceeds a predetermined value.

In operation a forward movement of pedal-operated member 20 closes axial reservoir valve 45 and opens inlet valve 53 allowing fluid under pressure into chamber 51. Fluid pressure acts on the exposed ends of extensions 65 of modulator pistons 3 to advance the modulator pistons which in turn advance the master cylinder pistons 4 to apply the brakes. In the event of a skid, the skid sensing means 43 allows the sensor on a wheel of the vehicle to send a signal to its associated solenoid control valve 35 which closes the connection between space 60 and reservoir 31 and opens the connection between chamber 51 and space 60, thus equalising the pressure across the modulator piston. By choosing appropriate diameters for the piston portions 61,63,65 the booster fluid can apply a net force to the modulator piston in the rearward direction. Therefore the modulator piston will retract and allow the braking pressure to be relieved. When the skid signal terminates space 60 is again connected to reservoir and the brakes are reapplied.

When the pedal is released, the pressure in chamber 51 acting in conjunction with a spring 51a returns the parts to the position of the drawing, first permitting inlet valve 53 to close and then opening the valve 45 to relieve the pressurized fluid in chamber 51 back to the reservoir 31. It should be noted that reservoir 31 is shown in three different positions in FIG. 1. This is to simplify the drawing, it being understood that the reservoir 31 in the various positions is the same reservoir.

In the event of a pressure failure in the booster supply the brakes can still be applied by direct engagement of flange 21 with the ends of the extensions 65.

An advantage of the construction described is that all the components of the assembly are moving continually so minimising the danger of a component failing to operate through disuse. For example pedal-operated member 20, modulator piston 3 and main piston 4 all move every time the brake is applied.

Also power assistance becomes operative after a relatively short pedal travel which only increases slightly on failure of the booster supply.

Another advantage is that several master cylinders each for operating a different wheel brake, can be combined into a single assembly with means for modulating the force applied to each master cylinder piston independently of pedal operation. The assembly can also be combined with the control valves so that a single assembly can automatically control the operation of each brake in accordance of the deceleration of the wheel being braked by the brake.

Figure 3:
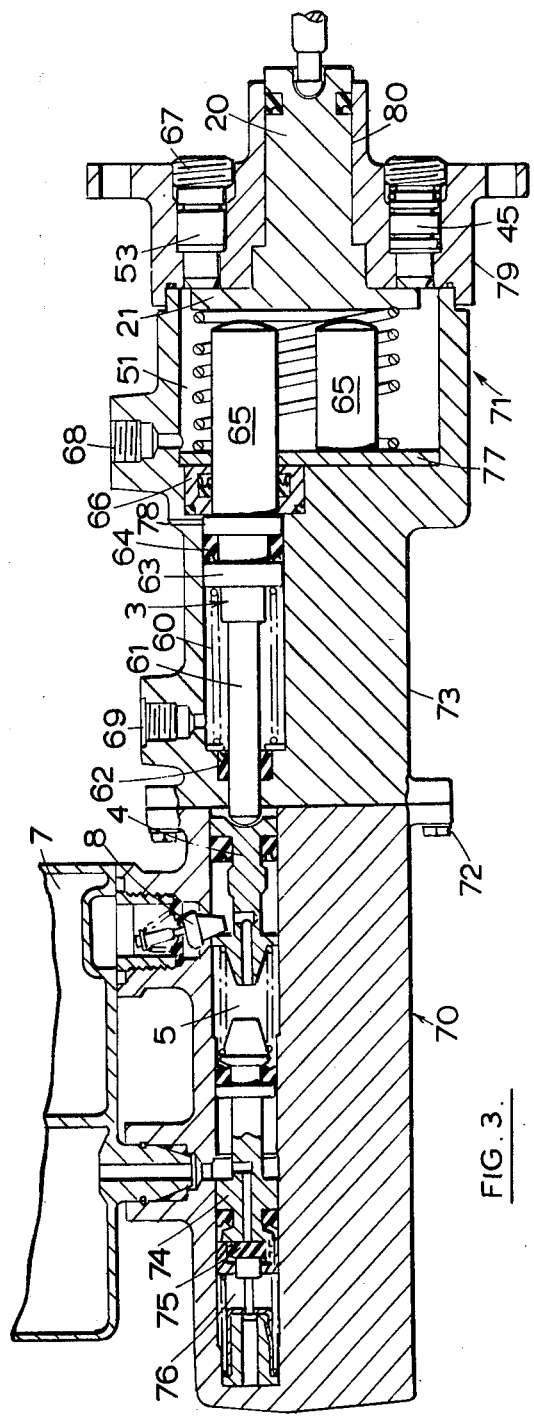
FIG. 3 is a longitudinal section of a second embodiment of the master cylinder assembly.

FIG. 3 shows a further modified master cylinder assembly in which three tandem hydrostatic master cylinders are formed in cylinder block 70 bolted on to one part 73 of a two part housing of the booster valve assembly 71. Each tandem master cylinder comprises the primary piston 4 actuating a tipping reservoir valve 8 and a secondary piston 74 actuating a centre reservoir valve 75. The outlet ports for the primary and secondary pressure space 5,76 are not shown.

As in the embodiment of FIGS. 1 and 2, the chamber 51 is formed by a recess in the end of housing part 73 opposite to the master cylinders. At the base of the recess is located a retaining plate 77 for seal assembly 66 which acts as a stop for modulator piston 3. A bleed passage 78 is located between the piston seal 64 and the seal assembly 66.

The other end of chamber 51 is formed by a second housing part 79 having an axial through bore 80 in which works the pedal-operated member 20. The radial flange 21 is adapted to operate the reservoir valve 45 and the booster inlet valve 54 located above and below bore 80 respectively. Valve 45 is spring biassed towards the closed position but is normally held open by flange 21. Valve 53 is spring biassed to the open position but is normally held closed by flange 21.

In normal conditions when the pedal-operated member 20 is advanced, reservoir valve 45 closes and inlet valve 53 opens allowing booster fluid into chamber 51 to advance the modulator pistons which in turn advance primary pistons 4. In skid conditions as in the embodiment of FIGS. 1 and 2 the control valve or control valves 35 operate so that the fluid pressure across the modulator piston or pistons is equalised and the or each piston retracts, allowing the braking pressure applied by the master cylinder pistons to be relieved. Should the booster pressure fail, flange 21 will engage the modulator pistons to apply them mechanically. If required one control valve could be arranged to control two or more modulator pistons.

Figure 4:
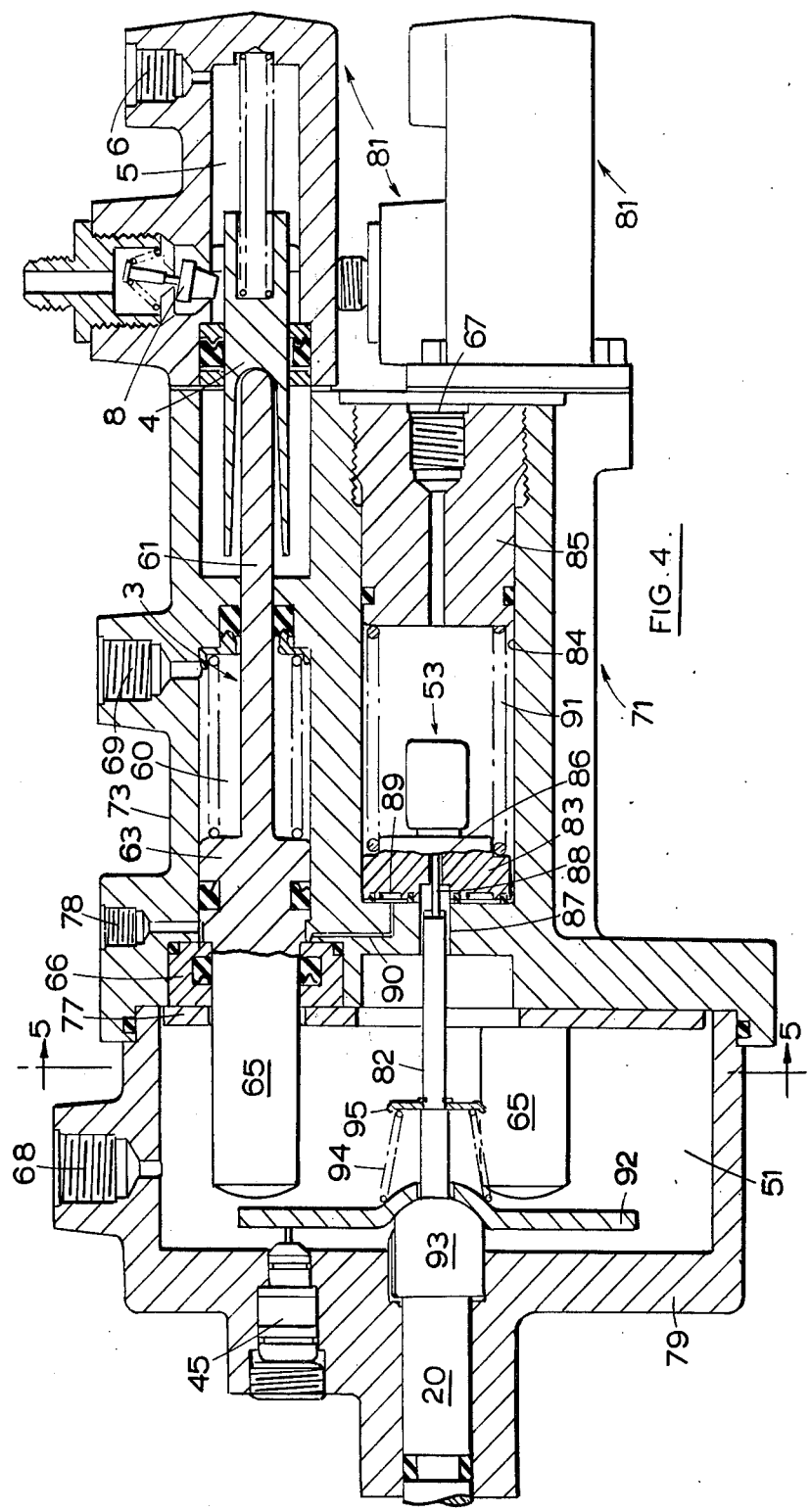
FIGS. 4 and 5 are interelated sections of a third embodiment.
Figure 5:
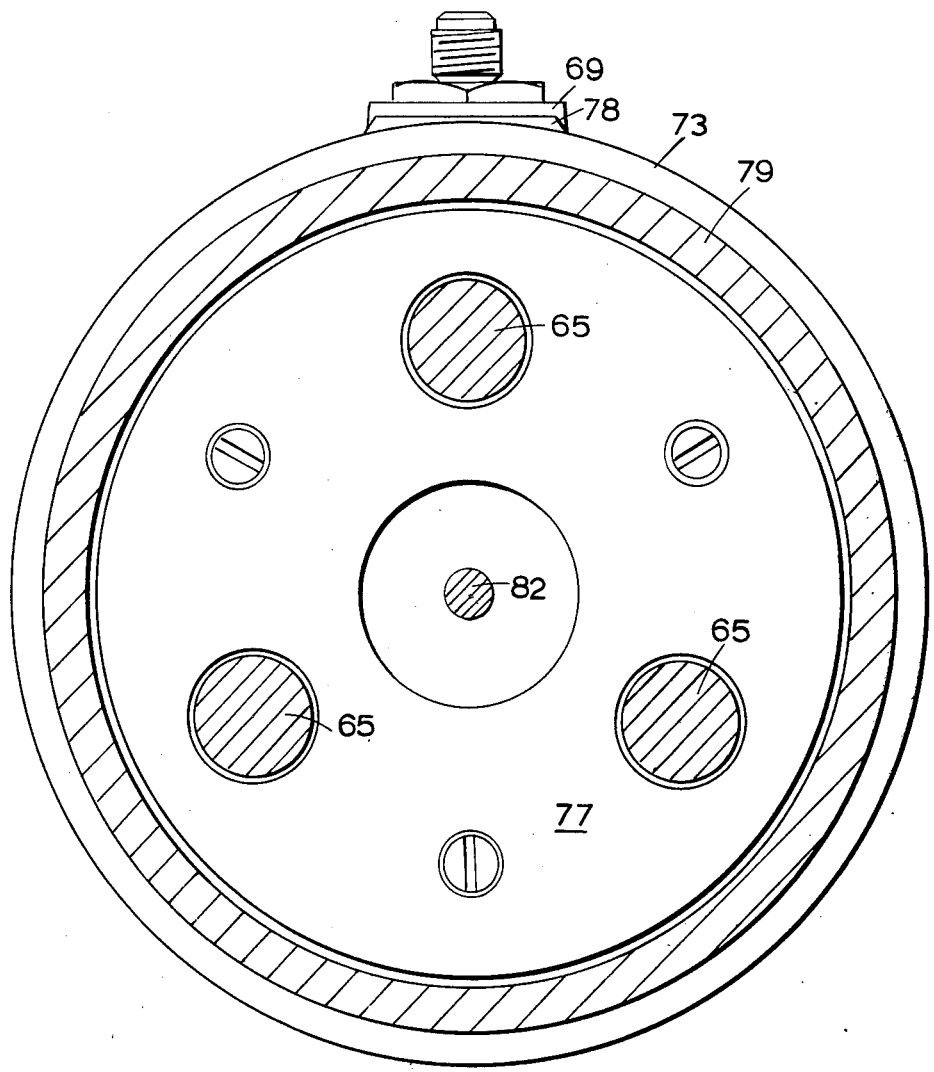

FIGS. 4 and 5 show a modification of the assembly of FIG. 3 and the same reference numerals have been used for equivalent parts. It will be seen that three separate single master cylinders 81 are bolted on to the booster valve assembly 71.

The main difference is the booster inlet valve 53 which is now an axial valve operated by a rod 82 extending from the pedal-operated piston 20. The valve comprises a movable stop member 83 located in an axial blind bore 84 opening to the face of housing part 73 adjacent the master cylinders, the open end of the bore being closed by a screwed plug 85 including the booster inlet port 67. An axial passage 86 in the stop member 83 is aligned with an axial passage 87 in the housing leading into recess 51. The rod 82 extends through passage 87 and an axial extension 88 of reduced diameter extends through passage 86 and is adapted to operate valve 53 which is spring-loaded to the closed position.

The face of the stop member 85 adjacent the base of bore 84 is formed with an annular recess 89 having seals on each side and this recess is connected to bleed passage 78 by an internal passage 90. Stop member 83 is normally urged against the base of bore 84 by a light spring 91.

In this embodiment flange 21 is replaced by an apertured plate 92 located on rod 82 and held against a domed shoulder 93 on member 20 by a spring 94 acting between plate 92 and a retainer 95 on the rod.

Operation of this embodiment is the same as that of FIG. 3 except that blind bore 84 is normally full of booster fluid so that when rod 82 engages stop member 83 after valve 53 has been opened by the rod extension 88, further forward movement of the pedal-operated member 20 is resisted by the pressure of the booster fluid acting over the area of the stop member between the two seals. This prevents excessive pedal movement. If booster pressure should fail spring 91 will offer little resistance to the extra pedal travel required to apply modulating pistons 3 by plate 92 which can rock on shoulder 93 to balance the pressures in the in the master cylinders.

Figure 6:
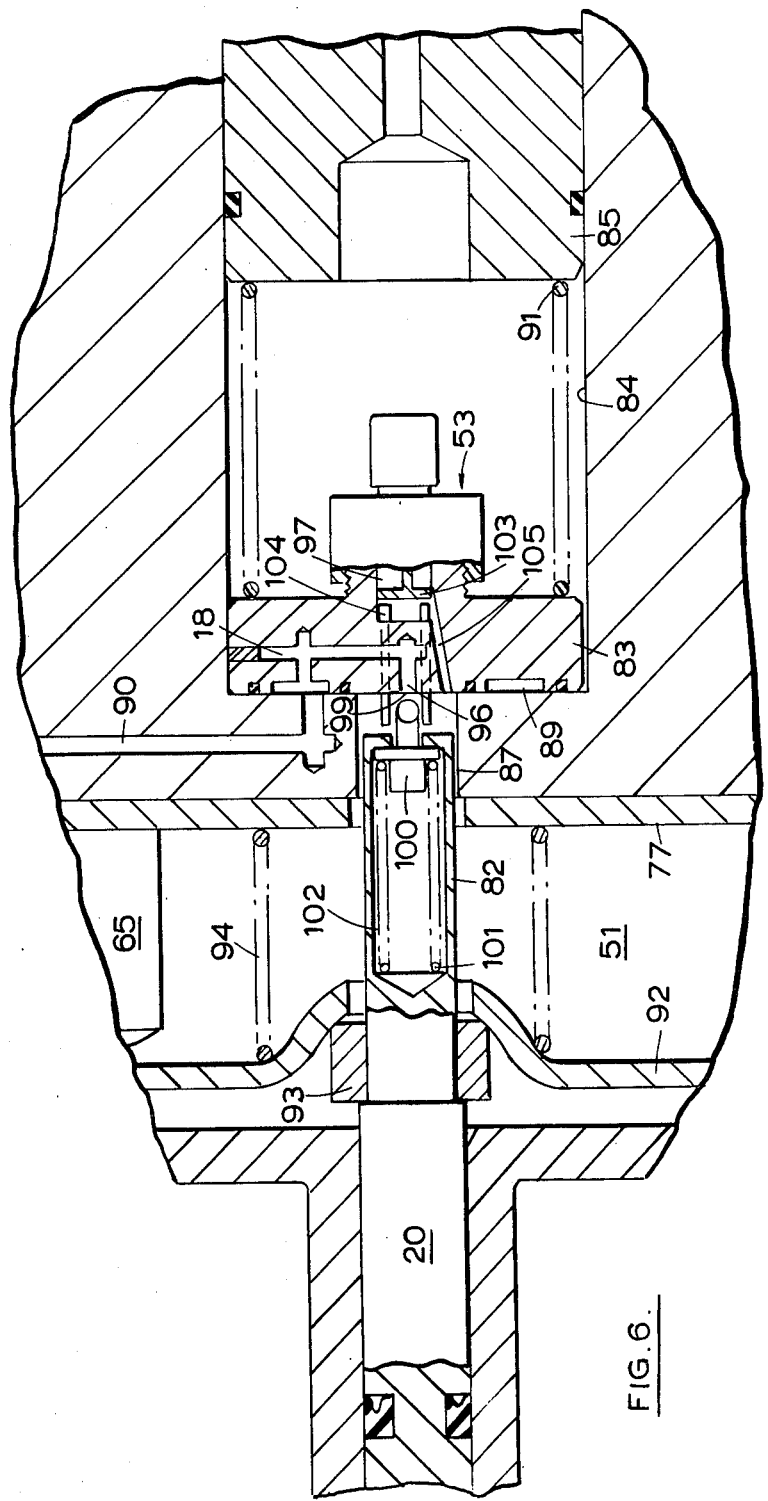
FIG. 6 is a modification of part of the assembly of FIGS. 4 and 5.

In the modification shown in FIG. 6 the reservoir valve 45 has also been made axial. Instead of an axial passage through the stop member 83 there are now opposed axial blind bores 96 and 97. The blind bore 96 opens to passage 87 in the housing and is connected to annular recess 89 by a passage 98, and its open end forms a seating 99 for valve member 100 located by spring 101 in a recess 102 in the end of rod 82.

The booster inlet valve 53 has also been modified slightly, the actuating member for the valve being a headed pin 103 adapted to be advanced by two push rods 104 slidingly fitted through stop member 83. Passage 97 in stop member 83 is permanently connected to passage 87 in the housing by an inclinded drilling 105.

In operation forward movement of pedal-operated member 20 brings valve member 100 into engagement with seating 99 to cut-off communication between chamber 51 and reservoir. Further movement of member 20 compresses valve spring 101 until the end of rod 82 engages push rods 104 which in turn engage headed pin 103, which opens the inlet valve 53, allowing pressure fluid into chamber 51 via passages 97, 105 and 87.

Figure 7:
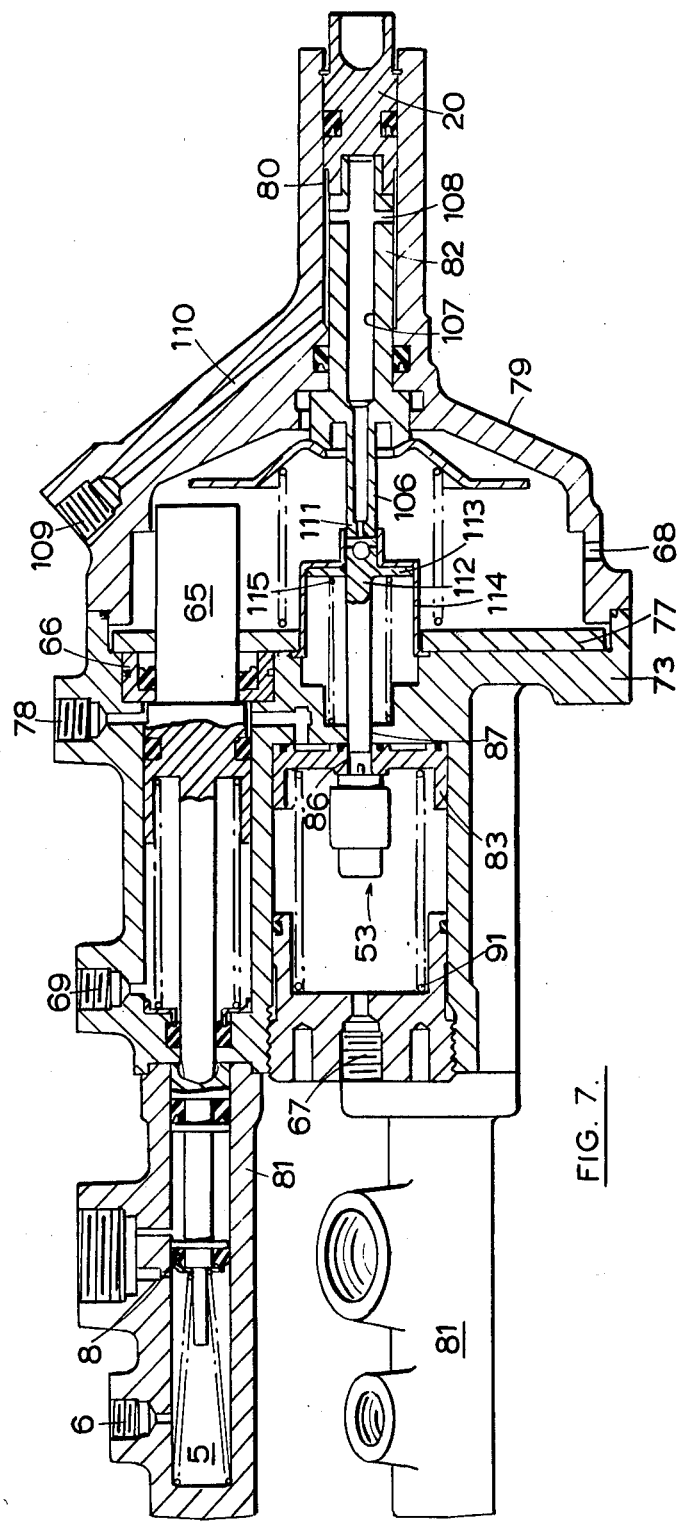
FIG. 7 is a section through a fourth embodiment.

The last embodiment of the master cylinder assembly shown in FIG. 7 is similar to the embodiment of FIGS. 4 and 5 and the same reference numerals have been used for equivalent parts. The master cylinders 81 are here single pressure space cylinders with piston seal reservoir valves 8. The chief difference is that booster reservoir valve 45 has been made axial but not so closely associated with the inlet valve as in the modification of FIG. 6.

In FIG. 7 the piston rod 82 is screwed into pedal operated member 20 and has a reduced diameter end portion 106. An axial passage 107 through the rod 82 communicates with bore 80 via radial passages 108 and the bore 80 is connected to a reservoir port 109 by a passage 110 through housing part 79. The end of passage 107 in rod end portion 106 forms a seating 11 for a valve member 112 which is guided in passage 87 in housing part 73. A radial flange 113 on valve member 112 is normally held in abutment with a cage 114 by a spring 115, the cage 114 being held onto housing 73 by the retaining plate 77 for seals 66.

In operation forward movement of rod 82 causes seating 111 to engage valve member 112 thus closing the reservoir connection. Continued forward movement of the rod 82 compresses spring 115 until the valve member 112 actuates inlet valve 53. Under normal conditions pedal movement is arrested when valve member 112 engages the end of passage 86 in the stop member 83.

I claim:

1. A power-operated hydraulic master cylinder assembly for a vehicle hydraulic braking system comprising a housing having a bore, a piston adapted to be advanced in said bore to generate fluid pressure in a pressure space defined in the bore at a position in advance of said piston, said housing also incorporating an inlet port for connection to a reservoir for fluid, and an outlet port leading from said pressure space for connection to a wheel brake, a normally open reservoir valve through which said pressure space is connected to said inlet port and which is closed when said piston is advanced in said bore, means defining in said housing a power chamber into which pressure fluid is admitted to advance said piston in said bore, a booster-valve assembly for controlling a supply of booster fluid to said power chamber, said booster-valve including a pedal-operated valve actuating member for applying an applying force manually to said piston in the event of a failure in said supply of booster fluid, and a stop member in said housing movable between an operative position and a retracted position spaced from said operative position, said stop member normally being biased by fluid pressure into said operative position to prevent said pedal-operated member from being advanced through a distance sufficient to transmit a force to said piston, and a reduction in pressure in said power chamber reducing the effective pressure acting on said stop member to allow said stop member to move into said retracted position in response to an applying force applied to said pedal-operated valve actuating member and transmitted to said piston, wherein said housing also includes a blind bore in which said stop member is located, said stop member includes a valve face, and a wall in said housing between said power chamber and said blind bore has a seating face which is engaged by said valve face when said stop member is in said operative position, said wall having a passage providing a connection between said blind bore and said power chamber, and said stop member having a passage aligned with said passage in said wall, an inlet valve being located in said stop member to control flow through said passage therein, and said actuating member extending through said passage in said wall to operate said inlet valve.

2. A master cylinder assembly as claimed in claim 1, wherein one of said faces is formed with an annular recess, and a pair of seals are located in one of said faces on opposite sides of said recess for sealing engagement with the other of said faces when said stop member is in said operative position, said wall having a bleed passage for connection to said recess, and said stop member being urged into engagement with said valve face by the pressure of said booster fluid acting over an area defined between said two seals.

* * * * *